US012640679B2

(12) United States Patent
Hu

(10) Patent No.: US 12,640,679 B2
(45) Date of Patent: May 26, 2026

(54) SOLAR ENERGY UTILIZATION DEVICE

(71) Applicants: BOLYMEDIA HOLDINGS CO. LTD., Santa Clara, CA (US); Xiaoping Hu, Shenzhen (CN)

(72) Inventor: Xiaoping Hu, Shenzhen (CN)

(73) Assignees: BOLYMEDIA HOLDINGS CO. LTD., Santa Clara, CA (US); Xiaoping Hu, Shenzhen (CN)

( * ) Notice: Subject to any disclaimer, the term of this patent is extended or adjusted under 35 U.S.C. 154(b) by 156 days.

(21) Appl. No.: 18/034,888

(22) PCT Filed: Nov. 4, 2020

(86) PCT No.: PCT/CN2020/126348
§ 371 (c)(1),
(2) Date: May 2, 2023

(87) PCT Pub. No.: WO2022/094777
PCT Pub. Date: May 12, 2022

(65) Prior Publication Data
US 2023/0412121 A1 Dec. 21, 2023

(51) Int. Cl.
*H02S 40/22* (2014.01)

(52) U.S. Cl.
CPC .................................... *H02S 40/22* (2014.12)

(58) Field of Classification Search
CPC ........ H02S 40/20; H02S 40/22; H10F 77/484; H10F 77/40–488; G02B 1/06; G02B 3/12–14; G02B 5/06; G02B 2006/0325
See application file for complete search history.

(56) References Cited

U.S. PATENT DOCUMENTS 5,977,478 A * 11/1999 Hibino .................. H10F 77/488
126/684
2001/0008144 A1* 7/2001 Uematsu ............ G02B 19/0028
136/246

(Continued)

FOREIGN PATENT DOCUMENTS

CN 108269870 A 7/2018
CN 109827344 A 5/2019

(Continued)

OTHER PUBLICATIONS

JP-2010062519-A English machine translation (Year: 2010).*

(Continued)

*Primary Examiner* — Andrew J Golden

(57) ABSTRACT

A solar energy utilization device, comprising a light energy utilization device and at least one liquid light condensing device. The liquid light condensing device is filled with a transparent liquid. The liquid light condensing device has at least one photoreceptor capable of transmitting sunlight into the transparent liquid and a reflector that reflects incident sunlight. In the liquid light condensing device, the sunlight that is reflected by the reflector and then transmitted to the photoreceptor from the transparent liquid forms a total reflection phenomenon, such that the sunlight is prevented from being refracted from the photoreceptor after being reflected by the reflector into the transparent liquid. Thus more sunlight is condensed onto a light energy utilization part of the light energy utilization device, thereby improving the light condensing efficiency.

7 Claims, 5 Drawing Sheets

(56)         References Cited

U.S. PATENT DOCUMENTS

| 2007/0227581 A1* | 10/2007 | Chen | H10F 77/488 |
| | | | 136/246 |
| 2010/0024868 A1* | 2/2010 | Baruchi | H10F 77/311 |
| | | | 136/246 |
| 2010/0269886 A1* | 10/2010 | Argentar | H10F 77/484 |
| | | | 136/246 |
| 2011/0162712 A1* | 7/2011 | Tillin | G02B 6/0046 |
| | | | 136/259 |
| 2011/0197968 A1* | 8/2011 | Montgomery | F24S 23/77 |
| | | | 136/259 |
| 2014/0123552 A1* | 5/2014 | Grenier | C12M 41/08 |
| | | | 47/1.4 |
| 2017/0115473 A1* | 4/2017 | Kozodoy | F24S 23/30 |

FOREIGN PATENT DOCUMENTS

| CN | 111869099 A | | 10/2020 | |
| DE | 102012011058 A1 | * | 12/2013 | ......... G02B 19/0042 |
| JP | 2010062519 A | * | 3/2010 | |
| WO | WO-2006133625 A1 | * | 12/2006 | ............. F24S 10/10 |
| WO | WO-2010134069 A1 | * | 11/2010 | ................ F24J 2/06 |
| WO | 2020154963 A1 | | 8/2020 | |

OTHER PUBLICATIONS

DE-102012011058-A1 English machine translation (Year: 2013).*
WO-2006133625-A1 English machine translation (Year: 2006).*
International Search Report of PCT Patent Application No. PCT/CN2020/126348 issued on Aug. 9, 2021.

* cited by examiner

SOLAR ENERGY UTILIZATION DEVICE

TECHNICAL FIELD

The present disclosure relates to light energy conversion utilization devices.

BACKGROUND

Solar energy systems are increasingly used with the reduction of the cost of photovoltaic panels and the increase of efficiency. However, as solar energy systems become more widely used, problems arise, such as increased land costs, the cost of plant maintenance (including cleaning of dust and sweeping of ice and snow), and difficulty in recycling photovoltaic panels.

SUMMARY

The present disclosure mainly provides a new type of solar energy utilization device to demonstrate a new solar energy utilization structure.

Based on the above object, a solar energy utilization device is provided in an embodiment of the present disclosure, comprising:

a light energy utilization unit having a light energy utilization portion capable of receiving, converting and utilizing sunlight; and at least one liquid condensing unit filled with a transparent liquid therein and having at least one light receiver capable of transmitting sunlight into the transparent liquid and a reflector for reflecting incident sunlight, the transparent liquid being in contact with the light receiver, the sunlight in the liquid condensing unit transmitted from the transparent liquid to the light receiver forming a total reflection phenomenon so as to concentrate the sunlight onto the light energy utilization portion of the light energy utilization unit.

In an embodiment, the liquid condensing unit has a condenser made of a light transmitting material, the light energy utilization portion is arranged outside the condenser, and the sunlight in the liquid condensing unit is concentrated toward the condenser to be entered into the light energy utilization portion.

In an embodiment, the liquid condensing unit has a condenser, the light energy utilization portion is part of the liquid condensing unit, and an outer wall of the light energy utilization portion is the condenser.

In an embodiment, a structure is arranged between the reflector and the light receiver such that the sunlight, after being reflected by the reflector, is transmitted from the transparent liquid to the light receiver to form the total reflection phenomenon.

In an embodiment, at least part of a reflective surface of the reflector forms an acute angle with a light receiving surface of the light receiver, the acute angle being less than or equal to 40 degrees.

In an embodiment, the liquid condensing unit has a closed cavity, a cavity wall of the closed cavity comprising the light receiver, the reflector and a condenser, and at least part of the closed cavity being filled with the transparent liquid therein.

In an embodiment, the reflector is a flat-plate component, a curved-plate component, or a folding-plate component.

In an embodiment, the light receiver and the reflector are flat-plate components arranged obliquely, the condenser is arranged below the light receiver and the reflector, upper ends of the light receiver and the reflector are connected to each other, and both ends of the condenser are connected to lower ends of the light receiver and the reflector, respectively.

In an embodiment, the light receiver is a curved-plate component, the condenser is arranged at an axial end of the light receiver, the reflector is a folding-plate component, another axial end of the light receiver is connected to the reflector, the light receiver is tilted such that an end of the light receiver connected to the condenser is lower than another end of the light receiver.

In an embodiment, the liquid condensing unit comprises a light guide element arranged in the transparent liquid and concentrating the sunlight to the light energy utilization unit.

In an embodiment, the liquid condensing unit comprises at least one transparent hollow element being in a closed structure or communicating with an atmospheric environment, a partial wall of the transparent hollow element being attached to or integrated with the reflector so as to reflect incident sunlight, and a partial wall of the transparent hollow element being in contact with the transparent liquid to transmit or totally reflect the sunlight.

In an embodiment, the partial wall of the transparent hollow element is closely attached to or integrated with the light guide element so as to concentrate the sunlight to the light energy utilization unit by reflection.

In an embodiment, at least two liquid condensing units are arranged on a same side of the light energy utilization unit to concentrate the sunlight onto the light energy utilization portion at the same side of the light energy utilization unit; or, the liquid condensing units are arranged on different sides of the light energy utilization unit to concentrate the sunlight onto the light energy utilization portion of the light energy utilization unit.

In an embodiment, the liquid condensing unit comprises a first liquid condensing unit and a second liquid condensing unit, and the light energy utilization portion is divided into a first light energy utilization portion and a second light energy utilization portion arranged away from each other, the first liquid condensing unit concentrating the sunlight onto the first light energy utilization portion, and the second liquid condensing unit concentrating the sunlight onto the second light energy utilization portion.

In an embodiment, the first light energy utilization portion is arranged upward, the second light energy utilization portion is arranged downward, the liquid condensing unit is arranged above the first light energy utilization portion, the second liquid condensing unit is arranged below the second light energy utilization portion, the light receivers of the first liquid condensing and the second liquid condensing unit are arranged toward a same side.

In an embodiment, the light receivers of the first and second liquid condensing units are arranged vertically, the reflector of the second liquid condensing unit includes a first reflector arranged behind the light receiver and a second reflector arranged below the light receiver, the second reflector being inclined downward and rearward from a lower end of the light receiving body.

In an embodiment, a light receiving area of the light receiver of the first liquid condensing unit is greater than a light receiving area of the light receiver of the second liquid condensing unit.

In an embodiment, the at least two liquid condensing units are communicated internally to form a same sealed cavity, and each liquid condensing unit directs the sunlight onto the light energy utilization portion at a same side or different sides of the light energy utilization unit.

In an embodiment, two adjacent liquid condensing units are arranged on a same side of the light energy utilization unit in a horizontal direction, the transparent liquid of the two adjacent liquid condensing unit communicate to form a liquid condensing unit group, the light receivers of the two adjacent liquid condensing units are connected to each other with a V-shaped connecting section, and each liquid condensing unit group concentrates the sunlight onto a same light energy utilization portion.

In an embodiment, the light energy utilization portion is divided into a first light energy utilization portion and a second light energy utilization portion arranged away from each other; and the liquid condensing unit group at least comprises a first liquid condensing unit group and a second liquid condensing unit group, the first liquid condensing unit group concentrating the sunlight to the first light energy utilization portion, and the second liquid condensing unit group concentrating the sunlight to the second light energy utilization portion.

In an embodiment, the light energy utilization unit is arranged vertically, the first liquid condensing unit group and the second liquid condensing unit group are distributed in an X shape, and upper ends of the first liquid condensing unit group and the second liquid condensing unit group define a cavity with an upper opening.

In an embodiment, an upper end of the light energy utilization unit is extended into the cavity, part of both upper ends of the first light energy utilization portion and the second light energy utilization portion are located in the cavity, the opening of the cavity is covered with a transparent closed cover to form a second closed cavity filled with transparent liquid, the sunlight is transmitted into the transparent liquid from the transparent closed cover, and at least partial wall of the cavity is a reflective surface so as to concentrate the sunlight to the first light energy utilization portion and the second light energy utilization portion.

In an embodiment, the device may further comprise an external reflecting unit arranged outside the light energy utilization unit and the liquid condensing unit wholly, the external reflecting unit having a reflective surface to concentrate the sunlight to the light energy utilization unit and the liquid condensing unit, and the external reflecting unit having a concave-inward structure or a Fresnel lens reflective surface.

In an embodiment, the transparent liquid comprises water or antifreeze transparent liquid.

In an embodiment, a bottom groove is arranged at the bottom of the liquid condensing unit to form a closed cavity with the bottom of the liquid condensing unit, the closed cavity being empty or provided with a second liquid.

In accordance with the solar energy utilization device mentioned in above embodiments, a light energy utilization unit and at least one liquid condensing unit are included, the liquid condensing unit being filled with transparent liquid, and the liquid condensing unit having at least one light receiver capable of transmitting sunlight into the transparent liquid and a reflector for reflecting incident sunlight. The sunlight in the liquid condensing unit transmitting to the light receiver from the transparent liquid can form a total reflection phenomenon so as to prevent the sunlight from being reflected into the transparent liquid by the reflector before being refracted from the light receiver, so that more sunlight can be concentrated onto the light energy utilization portion of the light energy utilization unit, thereby improving the concentration efficiency.

DETAILED DESCRIPTION

Figure 1:
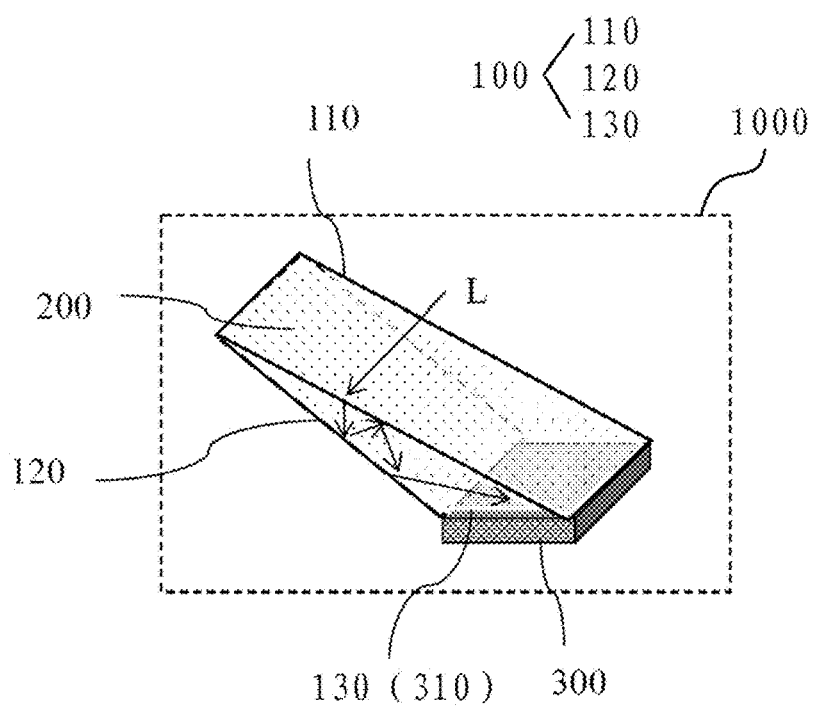
FIG. 1 is a schematic perspective diagram of a solar energy utilization device according to Example 1 of the present disclosure.

The present disclosure will be further described in detail below through specific embodiments with reference to the accompanying drawings. Common or similar elements are referenced with like or identical reference numerals in different embodiments. Many details described in the following embodiments are for better understanding the present disclosure. However, those skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For those skilled in the art, such operations are not necessary to be explained in detail, and they can fully understand the related operations according to the description in the specification and the general technical knowledge in the art.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

The serial numbers of components herein, such as "first", "second", etc., are only used to distinguish the described objects and do not have any order or technical meaning. The terms "connected", "coupled" and the like here include direct and indirect connections (coupling) unless otherwise specified.

A solar energy utilization device provided in an embodiment of the present disclosure can be configured for receiving and utilizing sunlight for energy conversion, converting the sunlight into electrical, thermal and other forms of energy for use.

The solar energy utilization device in the embodiment may include a light energy utilization unit and at least a liquid condensing unit.

The light energy utilization unit may has a light energy utilization portion capable of receiving, converting and utilizing the sunlight. In an embodiment, the light energy utilization portion may be one or more of a photovoltaic panel, a photothermal utilization unit, a combined photovoltaic and thermal utilization unit, a concentrating light energy utilization unit. The photovoltaic panel may generally refer to any component that can directly convert light energy into electrical energy, including various semiconductor photovoltaic panels, photovoltaic films, quantum dot photovoltaic conversion components, and the like. In other embodiments, the light energy utilization portion may also be another form of sunlight utilization converting structure.

The liquid condensing unit is filled with a transparent liquid through which the sunlight can pass. The liquid condensing unit may have a housing capable of enclosing a sealed cavity, and the transparent liquid may be directly filled in the sealed cavity enclosed by the housing. The transparent liquid may also be filled in a liquid container arranged in the sealed cavity. The liquid container may be enclosed by a separate wall or may share part of a wall with the housing.

The liquid condensing unit has at least one light receiver capable of transmitting the sunlight into the transparent liquid and a reflector capable of reflecting incident sunlight. The light receiver, made of light transmitting material and being in contact with the transparent liquid, may be served as part of the liquid container to store the transparent liquid.

The solar energy utilization device may be typically arranged with the light receiving surface of the light receiver facing the sun, so that the sunlight can be cast into the transparent liquid within the liquid condensing unit from the light receiving surface. The sunlight incident into the transparent liquid may pass through the transparent liquid, and part of the sunlight may enter the reflector and be reflected by the reflector into the transparent liquid. The structure of the liquid condensing unit may be configured as: making the sunlight be transmitted to the light receiver from the transparent liquid to form a total reflection (or total internal reflection) phenomenon; that is, the sunlight reflected into the transparent liquid will not or most of it will not exit from the light receiving surface, instead, it will continue to propagate in the liquid condensing unit under the effect of total reflection and finally concentrate onto the light energy utilization portion. In the present disclosure, the light totally reflected mainly comes from the light reflected by the reflector, however, it may be totally reflected and reused in the whole traveling light path within the liquid condensing unit.

In this embodiment, by employing the transparent liquid as a light propagation medium, and using the contact between the transparent liquid and the light receiver and the difference in refractive index between the light receiver and external air to form the total reflection phenomenon, the sunlight transmitted through the light receiving surface can be avoided from being reflected by the reflector into the transparent liquid before being refracted out from the light receiver, so that more sunlight can be concentrated onto the light energy utilization portion of the light energy utilization unit, thereby improving the concentration efficiency. The light receiver in this embodiment functions as both light transmission and total reflection. Compared with the prior art, under the same conditions of the light receiver, the liquid condensing unit can converge more sunlight onto the light energy utilization portion, increasing the concentration ratio.

In addition, the transparent liquid may also directly or indirectly form a heat transfer structure with the light energy utilization portion, which may further play a role in cooling or absorbing heat to the light energy utilization portion, so as to improve the rate of light energy utilization.

Further, in the process of forming the total reflection phenomenon described above, there is a structure between the reflector and the light receiver that enables the sunlight transmitted from the transparent liquid toward the light receiver to form the total reflection phenomenon. For example, the aforesaid total reflection phenomenon may be achieved by designing the shapes and structures of the reflector and the light receiver and the angle therebetween.

In implementing the total reflection phenomenon, the reflector may form a very small acute angle with the light receiver, for example, in an embodiment, at least a portion of the reflective surface of the reflector may form an acute angle which is less than or equal to 40 degrees with the light receiving surface of the light receiver, thereby reducing the overall height of the liquid condensing unit, making it more environmentally adaptable and applicable. The reflective surface of the reflector may refer to a side of the reflector that is used to reflect the sunlight incident from the transparent liquid. The light receiving surface of the light receiver may refer to a side where the sunlight enters the light receiver.

The liquid condensing unit may typically have a condenser onto which the liquid condensing unit collects all or most of the incident sunlight. In order to receive such sunlight, the light energy utilization portion may be attached to or integrated with the condenser; for example the light energy utilization portion may be arranged on the outside of the condenser. The condenser may be typically made from light transmitting material, the condenser having a concentrating surface from which the sunlight is injected into the condenser.

Specifically, in one embodiment, the condenser is made of the light transmitting material, and the light energy utilization portion is attached to the outside of the condenser. For example, the light energy utilization portion is fixedly attached to the outside of the condenser. In the liquid condensing unit, the sunlight may converge towards the condenser to enter the light energy utilization portion.

In another embodiment, the liquid condensing unit has a condenser, and the light energy utilization portion is part of the liquid condensing unit, the outer wall of the light energy utilization portion (a side surface for receiving the sunlight) being the condenser. That is, the outer surface of the light energy utilization portion is integrated with the condenser.

The condenser may be part of a wall containing the transparent liquid or may not be in direct contact with the transparent liquid.

In an embodiment, the liquid condensing unit may have a closed cavity, and the wall of the closed cavity may comprise the light receiver, the reflector and the condenser, that is, the closed cavity may be enclosed by the light receiver, the reflector and the condenser, or it may be enclosed by the light receiver, the reflector, the condenser together with other wall(s). At least part of the closed cavity may be filled with the transparent liquid therein. Typically, in one embodiment, the transparent liquid is filled with the closed cavity.

In an embodiment, the reflector may function primarily to reflect the sunlight, which may be a flat-plate component, a curved-plate component, a folding-plate component, or other shapes of component that meet the requirements for reflecting the sunlight. Further, in a modification based on the above idea of the present disclosure, the reflector may be either a single-sided reflection or a double-sided reflection, depending on a specific embodiment.

When the liquid condensing unit is utilized, one or more liquid condensing units may be used for concentration. Accordingly, the light energy utilization unit may have one or more light energy utilization portions, or may be provided with one or more light energy utilization units to be used in combination with the liquid condensing unit. Alternatively, the light energy utilization unit may be a light energy utilization unit with a built-in condenser.

In one embodiment, the liquid condensing unit may also include a light guide element to enhance light-gathering effect. The light guide element is placed inside the transparent liquid to concentrate the sunlight to the light energy utilization unit. The light guide element may direct the sunlight in reflection or refraction, so as to facilitate concentrating the sunlight toward the direction of the light energy utilization unit.

Further, in one embodiment, the liquid condensing unit may comprise at least one transparent hollow element. The transparent hollow element is enclosed or in communication with the atmosphere. Part of the wall(s) of the transparent hollow element may be attached to or integrated with the reflector to reflect incident sunlight. Part of the wall(s) of the transparent hollow element may be in contact with the transparent liquid to transmit or totally reflect the sunlight. The main role of the transparent hollow element is to better direct the light to the light energy utilization unit, thereby expanding the concentration ratio.

The light guide element and the transparent hollow element may be used separately or in combination. In an embodiment, when the light guide element and the transparent hollow element are used in combination, a portion of the wall of the transparent hollow element may be closely attached to or integrated with the light guide element to reflect the sunlight concentrate toward the light energy utilization unit.

In an embodiment, there are at least two liquid condensing units which are arranged on the same side of the light energy utilization unit so as to concentrate the sunlight onto the light energy utilization portion at the same side of the light energy utilization unit. Alternatively, the liquid condensing units are arranged on different sides of the light energy utilization units to concentrate the sunlight onto the light energy utilization portion at different sides of the light energy utilization unit.

In an embodiment, the transparent liquid may be a liquid that can transmit the sunlight and form the total reflection phenomenon with the light receiver. For example, in an embodiment, the transparent liquid may comprise water or antifreeze transparent liquid. The antifreeze transparent liquid may employ, but is not limited to, a mixture of water and glycerin, a mixture of water and propylene glycol, a mixture of water and diethylene glycol, and the like.

Based on the above inventive concept, several different embodiments are further described below to better illustrate the inventive concept.

Example 1

Referring to FIG. 1, in the solar energy utilization device 1000 shown in Example 1, the light receiver 110 and the reflector 120 are both flat-plate components arranged obliquely. The condenser 130 is located below the light receiver 110 and the reflector 120. The upper ends of the light receiver 110 and the reflector 120 are connected to each other, and both ends of the condenser 130 are connected to the lower ends of the light receiver 110 and the reflector 120, respectively.

In this embodiment, the liquid condensing unit has a housing that encloses a closed cavity. The housing includes the light receiver 110, the reflector 120, the condenser 130, and other necessary walls. The transparent liquid 200 fills in the closed cavity, for example, fully filling the entire closed cavity.

In other embodiments, the transparent liquid 200 may be filled in a liquid container, which in turn is integrally immersed in the closed cavity formed by the housing. The liquid container may share only a portion of the wall with the housing, such as the light receiver 110.

In FIG. 1, L represents incident light. The arrows in FIG. 1 show the process in which incident light is reflected by the reflector 120 back to the light receiver 110, then is totally reflected by the light receiver 110, and finally reaches the light energy utilization unit 300. This embodiment makes full use of the total reflection function of the transparent liquid 200 in the liquid condensing unit 100 to increase the concentration ratio. That is, the light receiver 110 has two functions at the same time: transmitting externally incident light and totally reflecting the reflected light from the transparent liquid 200 (reflected by the reflector 120). Conventional concentrating grooves never take advantage of the full reflection formed by the light receiver 110 and the transparent liquid 200; and to take advantage of this function, it is necessary to consider the deflection range of the sunlight and the refractive index of the transparent liquid 200 when designing the angle between the light receiver 110 and the reflector 120.

Since the principle of total reflection is utilized in the present disclosure, an included angle between the reflective surface of the reflector 120 and the light receiving surface of the light receiver 110 may be an acute angle less than or equal to 40°. Such structure can reduce the height of the liquid condensing unit 100, making it more adaptable to the environment and more applicable sites. This is difficult to achieve by existing concentrating grooves, which do not take advantage of the total reflection function of the light receiver 110 when filling the transparent liquid.

In some embodiments, the liquid condensing unit 100 may also be used simultaneously to cool the light energy utilization unit 300 to improve the utilization efficiency of light energy.

In this embodiment, both the light receiver 110 and the reflector 120 are flat-plate components. In other embodiments, the light receiver 110 and the reflector 120 may be curved-plate components, folding-plate components, or other shapes of components that meet functional requirements. The light receiving surface may be a smooth surface or may be partially or fully a Fresnel lens. Similarly, the reflective surface may also be a smooth surface or a Fresnel lens reflective surface. In one embodiment, the Fresnel lens may be constructed by using the transparent liquid 200, thereby dramatically reducing cost.

In the present embodiment, according to different embodiments and application requirements, the condenser 130 may be a separate transparent body, or the light energy utilization unit 300 may be used to perform the function of the condenser 130, and the outer surface of the light energy utilization unit 300 (such as the light energy utilization portion 310) is designed as an integral structure with the condenser 130. For example, the outer wall of the light energy utilization unit 300 (such as the light energy utilization portion 310) is integrated with the condenser 130, or the outer wall of the light energy utilization unit 300 (such as the light energy utilization portion 310) is used as the condenser 130.

In this embodiment, the transparent liquid 200 may be purified water, an antifreeze liquid (a mixture of water and ethylene glycol), or other ring-protected transparent liquid 200 (such as a mixture of water and propylene glycol, diethylene glycol, glycerol). In this embodiment, the light energy utilization unit 300 may be any form of light energy utilization including, but not limited to, single or double sided photovoltaic panels, photothermal utilization devices, photovoltaic and photothermal integrated utilization devices, and single or double sided concentrating light energy utilization unit 300.

The liquid condensing unit 100 in the present embodiment has many advantages over conventional side condensers, including the sunlight concentrate to the condenser 130 from side(s), and thus has a better angle of incidence, a larger concentration ratio, and a higher concentration efficiency. In addition, the transparent liquid 200 can also be used in thermal communication with the light energy utilization unit 300 to absorb or even utilize the heat of the light energy utilization unit 300 to improve the light energy utilization efficiency of the light energy utilization unit 300. If necessary, an external thermal cycle can also be performed to utilize the heat absorbed by the transparent liquid 200.

Example 2

This Example 2 provides another solar energy utilization device 1000.

Figure 2:
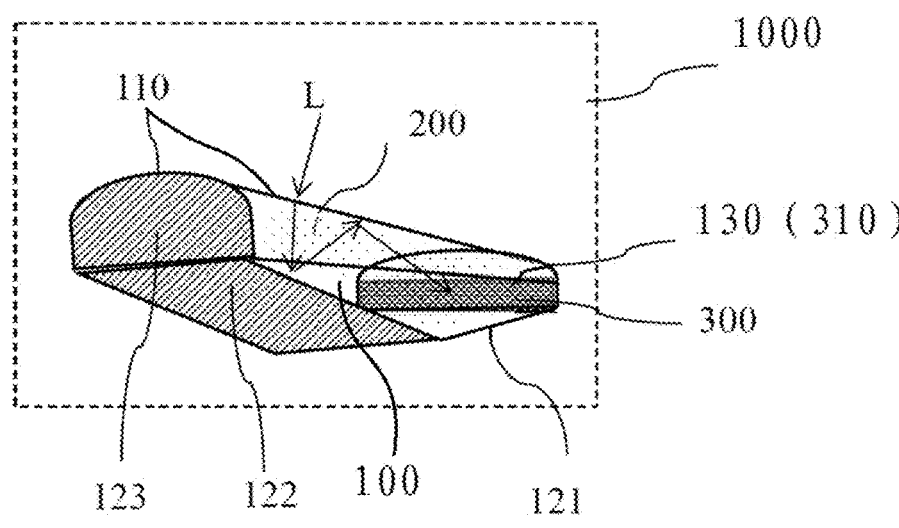
FIG. 2 is a schematic perspective diagram of a solar energy utilization device according to Example 2 of the present disclosure.

Referring to FIG. 2, in this embodiment, the light receiver 110 is a curved-plate component. The condenser 130 is located at an axial end of the light receiver 110. The reflector 120 is a folding-plate component, and the other axial end of the light receiver 110 is connected to the reflector 120. The light receiver 110 is tilted so that one end of the light receiver 110 connected to the condenser 130 is lower than the other end of the light receiver 110.

The light receiver 110 is arc-shaped along a direction in which the reception range of the sunlight can be expanded to accommodate a certain angular deflection of the sunlight. At the same time, the light receiver 110 is also inclined along the axial direction thereof, thereby also expanding the reception range of the sunlight in the axial direction thereof, so that the light receiver 110 of the present embodiment has the ability to accommodate a certain deflection of the sunlight in both directions. For example, its inclined direction can be used to accommodate the latitude and north-south return angles of the sunlight, while its bend direction can accommodate the east-west direction of the sunlight.

With continued reference to FIG. 2, in this embodiment, the reflector 120 is divided into three reflectors 120 in a folded surface structure, i.e. a first reflector 121, a second reflector 122 and a third reflector 123, respectively, wherein the first reflector 121 is arranged opposite to the condenser 130, the second reflector 122 and the third reflector 123 are connected and integrally connected between the first reflector 121 and the condenser 130, and the reflector 120, the light receiver 110 and the condenser 130 are enclosed as a closed cavity so as to form the housing of the liquid condensing unit 100 (which can also be considered as the liquid container storing the transparent liquid 200), and the transparent liquid 200 is filled in the closed cavity. Of course, in other embodiments, the housing may incorporate walls other than the reflector 120, the light receiver 110, and the condenser 130 to enclose the closed cavity.

Example 3

This Example 3 provides yet another solar energy utilization device 1000, in particular a way of using more than two liquid condensing units 100 in combination.

Figure 3:
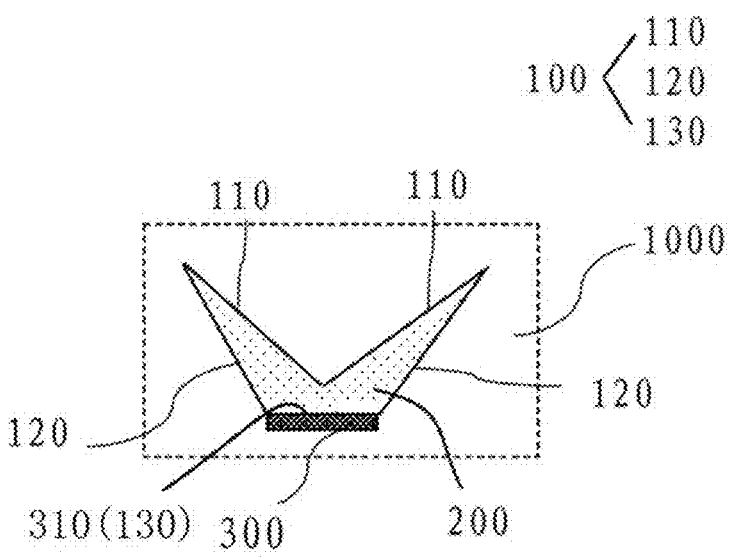
FIG. 3 is a schematic cross-sectional diagram of a solar energy utilization device according to Example 3 of the present disclosure.

Referring to FIG. 3, a cross-sectional view of a solar energy utilization device 1000 is shown. In this embodiment, at least two liquid condensing units 100 are provided. The at least two liquid condensing units 100 are communicated internally so as to be communicated as one sealed cavity. The transparent liquid 200 is filled in the sealed cavity. The liquid condensing unit 100 directs the sunlight onto the light energy utilization portion 310 on the same or different sides of the light energy utilization unit 300. Here, as shown in FIG. 3, the liquid condensing unit 100 directs the sunlight to the same side of the light energy utilization unit 300, e.g. the sunlight concentrate to one light energy utilization portion 310 or a different light energy utilization portion 310 located on the same side.

With continued reference to FIG. 3, in one embodiment, two adjacent liquid condensing units 100 are horizontally disposed on the same side of the light energy utilization unit 300, and the transparent liquid 200 of the two adjacent liquid condensing units 100 communicate, forming a group of liquid condensing units 100. The light receivers 110 of the two adjacent liquid condensing units 100 are connected to each other, and the connection section thereof is V-shaped. Each group of liquid condensing units 100 concentrate the sunlight onto the same light energy utilization portion 310.

In this embodiment, the two liquid condensing units 100 may be arranged symmetrically (mirrored) or asymmetrically. The two liquid condensing units 100 are partially overlapped with each other, and the light receivers 110 thereof can be connected together and realized as a continuous surface integration. The transparent liquid 200 of the two liquid condensing units 100 is mixed together. Also, in other embodiments, the reflectors 120 disposed on the same or different sides of the liquid condensing units 100 may be connected together.

In other embodiments, the two liquid condensing units 100 may be arranged on different sides of the light energy utilization unit 300. In this case, the light energy utilization unit 300 may have the ability to double-sided absorb light energy, such as a double-sided light energy utilization unit 300. Of course, it is also possible to provide two single-sided light energy utilization units 300 that absorb light energy and place them together in such a way that the light energy utilization portion 310 faces away from each other to receive the sunlight on both sides.

Example 4

This Example 4 provides still another solar energy utilization device 1000, and in particular a scheme for adding a transparent hollow element to the liquid condensing unit 100.

Figure 4:
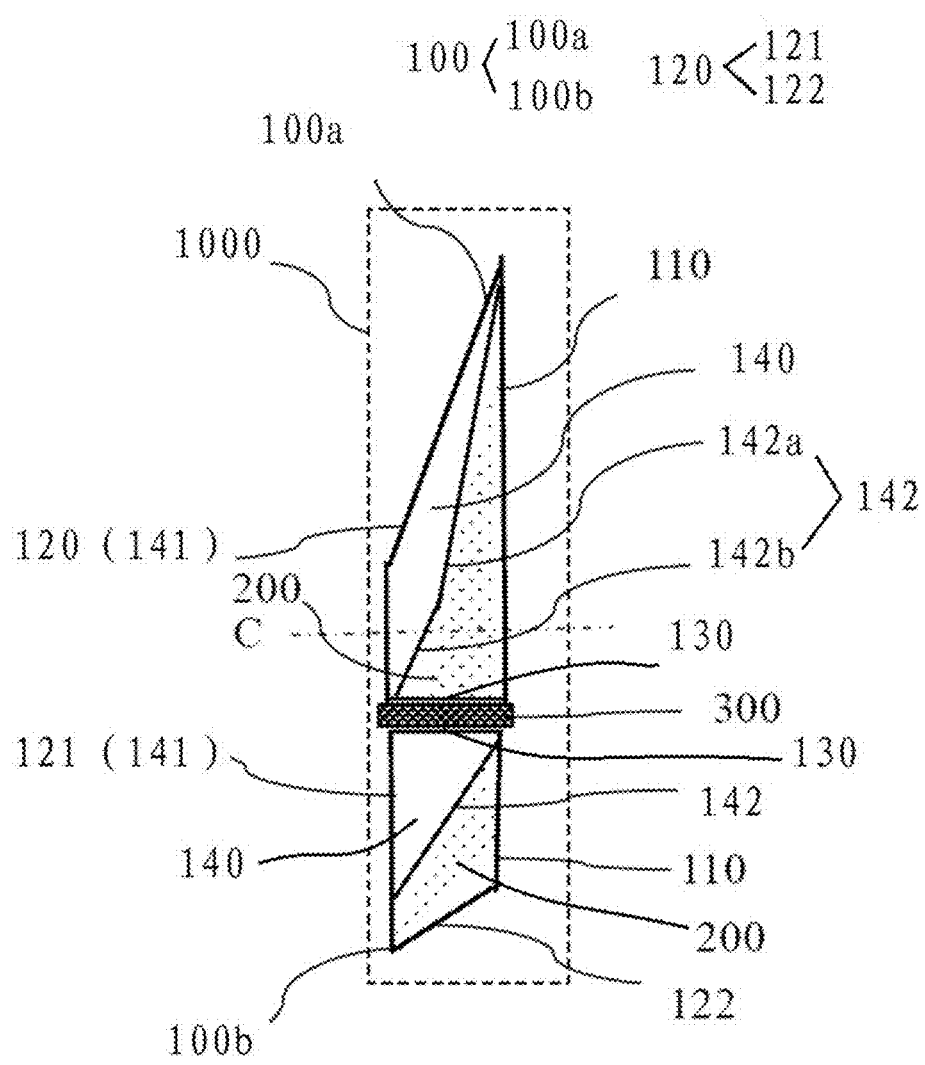
FIG. 4 is a schematic cross-sectional diagram of a solar energy utilization device according to Example 4 of the present disclosure.

Referring to FIG. 4, a cross-sectional view of a solar energy utilization device 1000 is shown. In this embodiment, the liquid condensing unit 100 includes at least one transparent hollow element 140. The transparent hollow element 140 is a closed structure or is in communication with the atmosphere. For example, the transparent hollow element 140 can be completely closed and located in the housing of the liquid condensing unit 100, and can also be provided with some openings in communication with the external atmosphere.

A portion of the wall 141 of the transparent hollow element 140 is attached to or is integrally formed with the reflector 120 to reflect the incident sunlight. A portion of the wall 142 of the transparent hollow element 140 is in contact with the transparent liquid 200 to transmit or totally reflect the sunlight.

The primary function of the transparent hollow element 140 is to better direct light to the light energy utilization unit 300, thereby enlarging the concentration ratio. Another additional function is to address the solidification or expansion of the transparent liquid 200 when the solar energy utilization device 1000 is used in cold regions by squeezing the volume of the transparent hollow element 140.

With continued reference to FIG. 4, in one embodiment, the liquid condensing unit 100 includes a first liquid condensing unit 100*a* and a second liquid condensing unit 100*b*. The first liquid condensing unit 100*a* and the second liquid condensing unit 100*b* are respectively provided with a corresponding transparent hollow element 140. The light energy utilization portion 310 is divided into a first light energy utilization portion and a second light energy utilization portion that are disposed away from each other. The first liquid condensing unit 100*a* concentrates the sunlight onto the first light energy utilization portion and the second liquid condensing unit 100*b* concentrates the sunlight onto the second light energy utilization portion.

Referring to FIG. 4, in one embodiment, the first light energy utilization portion is disposed upward, the second light energy utilization portion is disposed downward, the first liquid condensing unit 100*a* is disposed above the first light energy utilization portion, the second liquid condensing unit 100*b* is disposed below the second light energy utilization portion, and the light receivers 110 of the first liquid condensing unit 100*a* and the second liquid condensing unit 100*b* are disposed toward the same side. In addition, in other embodiments, the first liquid condensing unit 100*a* and the second liquid condensing unit 100*b* may be horizontally disposed left and right.

Although two liquid condensing units 100 are shown in the embodiment shown in FIG. 4, the structure of the transparent hollow element 140 shown in this embodiment may be applied to other embodiments having one or more liquid condensing units 100.

Further, in one embodiment, referring to FIG. 4, the light receiver 110 of the first liquid condensing unit 100*a* and the second liquid condensing unit 100*b* are vertically disposed. The reflector 120 of the second liquid condensing unit 100*b* has a first reflector 121 located at a rear side of the light receiver 110 and a second reflector 122 located at a lower side of the light receiver 110, the second reflector 122 being inclined from a lower end of the light receiver 110 downward and rearward. This design is significantly different from that of a conventional concentrating device, in which the second reflector 122 is generally arranged at lower side from the back to front (the incident direction of the sunlight is defined as front in the present disclosure) so as to better concentrate the sunlight towards the light energy utilization unit 300. Since the present embodiment adopts the principle of total reflection, arranging the second reflector 122 obliquely backward and downward from the lower end of the light receiver 110 can further expand the condensing ratio.

Specifically, referring to FIG. 4, in the two stacked liquid condensing units 100 (i.e. the first liquid condensing unit 100*a* and the second liquid condensing unit 100*b*), each liquid condensing unit 100 itself constitutes one closed cavity in which the transparent liquid 200 is filled fully. A double-sided light energy utilization unit 300 with double-sided absorbing light energy capability is sandwiched between the two liquid condensing units 100. A first liquid condensing unit 100*a* and a second liquid condensing unit 100*b* are respectively provided with a corresponding transparent hollow element 140.

In one embodiment, since FIG. 4 is a cross-sectional view, the hollow quadrilateral and hollow trilateral transparent hollow elements 140 in FIG. 4 correspond to a quadrilateral sleeve and a trilateral sleeve, respectively, in a three-dimensional structure. The transparent hollow elements 140 may be provided with air or other gas, or may be a vacuum.

In one embodiment, the bottom surface 141 of the upper transparent hollow element 140 overlaps the bottom of the reflector 120, and the transparent hollow element 140 has a side wall 142*b* adjacent to the light energy utilization unit 300 and a side wall 142*a* away from the double-sided light energy utilization unit 300. The side wall 142*a* away from the double-sided light energy utilization unit 300 functions primarily as a transmission, while the side wall 142*b* closer to the double-sided light energy utilization unit 300 functions as either a transmission or total reflection for light at different incidence angles.

For a side-concentrating solar device with only one liquid condensing unit 100, a transparent hollow element 140 may also be provided. The transparent hollow element 140 may be closed, or be open at both ends to communicate with the outside atmosphere.

The surface of the transparent hollow element 140 need not be planar. In other embodiments, the transparent hollow element 140 may be a pentagonal sleeve or other shaped sleeve. Since the transparent hollow element 140 is closely attached and fixed to the reflector 120, they can be integrated when implemented. Thus, in another embodiment, the transparent hollow element 140 is integrated with the reflector 120 in an integrated manner.

Further, as shown in FIG. 4, the light receiving area of the light receiver 110 of the first liquid condensing unit 100*a* is greater than the light receiving area of the light receiver 110 of the second liquid condensing unit 100*b*. Specifically, in FIG. 4, C represents the center of the side-concentrating solar device. Obviously, the light energy utilization unit 300 is not on the center line, and the area of the light receiver 110 located above is larger than that of the light receiver 110 located below, in order to accommodate the phenomenon that the sunlight is incident obliquely above, and the light receiver 110 located above is more likely to accept more sunlight. FIG. 4 shows an asymmetric implementation, but in other embodiments, two liquid condensing units 100 may be referred to as a top-bottom symmetric configuration.

Further, in one embodiment, the two liquid condensing units 100 and the double-sided light energy utilization unit 300 may be modular for shipping, installation, and maintenance, and may reduce waste during recycling.

Example 5

This Example 5 provides still yet another solar energy utilization device 1000, and in particular a scheme of using light guide element to enhance the light-gathering effect.

Figure 5:
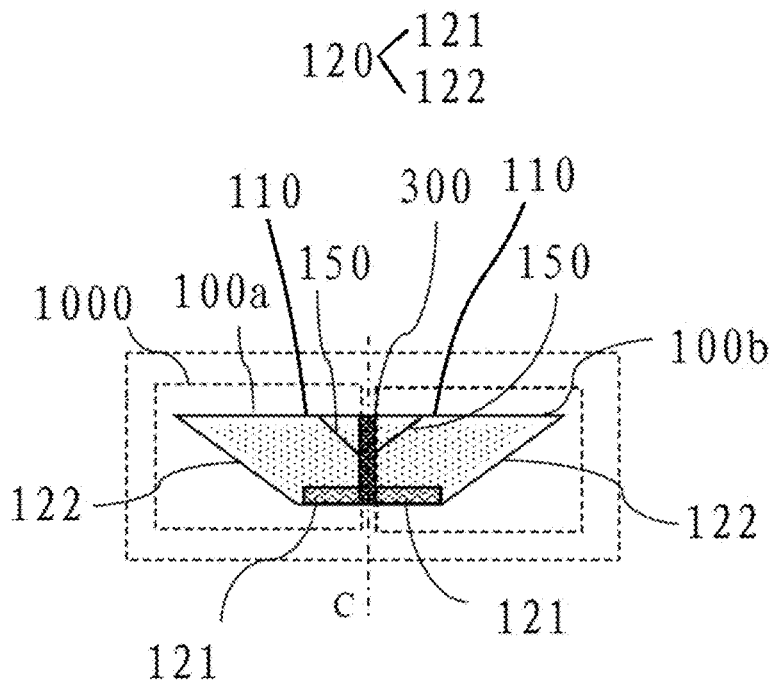
FIG. 5 is a schematic cross-sectional diagram of a solar energy utilization device according to Example 5 of the present disclosure.

Referring to FIG. 5, a cross-sectional view of a solar energy utilization device 1000 is shown. The liquid condensing unit 100 includes a light guide element 150 arranged in the transparent liquid 200 to concentrate the sunlight towards a light energy utilization unit 300. The light guide element 150 may focus the sunlight by reflection or refraction effects.

In one embodiment, the light guide element 150 reflects the sunlight. The light guide element 150 is arranged obliquely in the transparent liquid 200 of the liquid condensing unit 100, The end of the light guide element 150 away from the light energy utilization unit 300 is higher than the end thereof closer to the light energy utilization unit 300, so as to facilitate concentrating the sunlight in the direction of the light energy utilization unit 300.

In one embodiment, referring to FIG. 5, the liquid condensing unit 100 includes a first liquid condensing unit 100*a* and a second liquid condensing unit 100*b*. The light energy utilization portion 310 is divided into a first light energy utilization portion and a second light energy utilization portion that are disposed away from each other. The light energy utilization unit 300 is vertically disposed, and the first liquid condensing unit 100*a* and the second liquid condensing unit 100*b* are arranged on the left and right sides of the light energy utilization unit 300, respectively. The first liquid condensing unit 100*a* concentrates the sunlight onto the first light energy utilization portion, the second liquid condensing unit 100*b* concentrates the sunlight onto the second light energy utilization portion, and the light receivers 110 of the first liquid condensing unit 100*a* and the second liquid condensing unit 100*b* are disposed upward so as to better receive sunlight incident from above.

FIG. 5 shows two liquid condensing unit 100. However, the light guide element 150 may be applied to a scheme having one or more liquid condensing units 100, and is not limited to the structure shown in FIG. 5.

Specifically, referring to FIG. 5, the first liquid condensing unit 100*a* and the second liquid condensing unit 100*b* are arranged symmetrically (mirrored) in parallel, and the light energy utilization unit 300 is arranged on the center line (C in FIG. 5) of the solar energy utilization device 1000. Of course, they may be provided asymmetrically in other embodiments.

The first liquid condensing unit 100*a* and the second liquid condensing unit 100*b* are respectively provided with a double-sided reflective light guide element 150 (such as a double-sided reflective light guide plate).

Further, in one embodiment, the light receivers 110 of the first liquid condensing unit 100*a* and the second liquid condensing unit 100*b* may be implemented using a larger transparent panel; and the condensers 130 and the reflectors 120 of the first liquid condensing unit 100*a* and the second liquid condensing unit 100*b* are sealingly connected to the light receiver 110, thereby forming a large closed cavity with the double-sided light energy utilization unit 300 immersed in the transparent liquid 200 of the large closed cavity.

In one embodiment, referring to FIG. 5, two reflectors 120 are formed with two plate members 121, 122, respectively, forming a folded surface shape. Due to the structural features of this embodiment, the two bottom plate members 121 can be realized with one larger plate member. Also, in this embodiment, this larger plate member 121 may have a Fresnel lens reflective surface or other reflective surface.

To further reduce reflection losses, in one embodiment, the light guide element 150 employs a double-sided reflective light guide plate, thereby enabling this embodiment to achieve a higher concentration ratio at a lower height.

This example shows a highly integrated implementation, i.e. the two liquid condensing units 100 constitute a large closed cavity filled with the transparent liquid 200 and a double-sided light energy utilization unit 300 immersed in a liquid.

Example 6

This Example 6 provides yet still another solar energy utilization device 1000, especially a further improvement based on Example 5.

Figure 6:
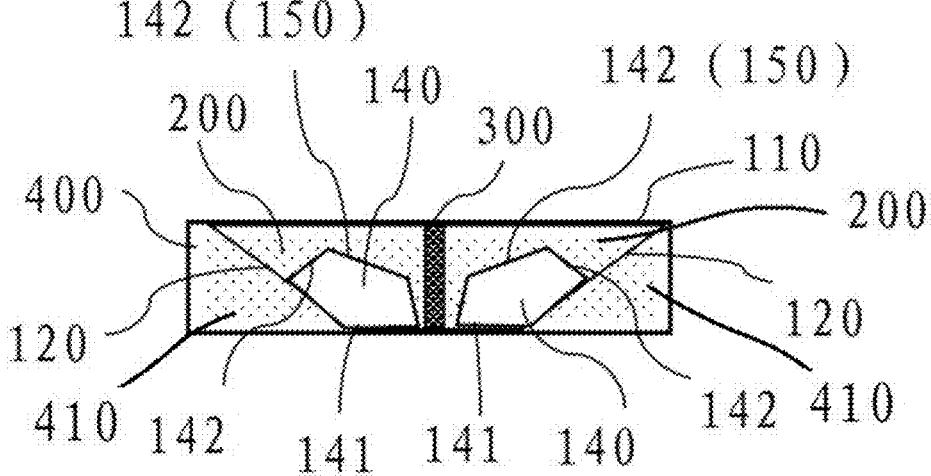
FIG. 6 is a schematic cross-sectional diagram of a solar energy utilization device according to Example 6 of the present disclosure.

Referring to FIG. 6, a cross-sectional view of a solar energy utilization device 1000 is shown. In this embodiment, the liquid condensing unit 100 further comprises at least one transparent hollow element 140 based on the light guide element 150. The transparent hollow element 140 is a closed structure or in communication with the atmosphere. Part of the wall 141 of the transparent hollow element 140 is attached to or integrated with the reflector 120 so as to reflect the incident sunlight, and part of the wall 142 of the transparent hollow element 140 is closely attached to or integrated with the light guide element 150 so as to concentrate the sunlight towards the light energy utilization unit 300 through reflection.

In this embodiment, the transparent hollow element 140 is used in conjunction with the light guide element 150 (e.g. a double-sided reflective light guide plate). When they are used in combination, as shown in FIG. 6, the light guide element 150 is disposed on the top surface of the transparent hollow element 140.

In one embodiment, because FIG. 6 is a cross-sectional view, the transparent hollow element 140 in hollow pentagonal shape in FIG. 6 corresponds to a pentagonal sleeve in a three-dimensional configuration.

This example further differs from Example 5 in that:

A bottom groove 400 is also provided at the bottom of the liquid condensing unit 100, forming a closed cavity with the bottom of the liquid condensing unit 100. The closed cavity is filled with second liquid 410, and the liquid condensing unit 100 and the light energy utilization unit 300 are immersed integrally in the second liquid 410. The second liquid 410 may be the same as or different from the transparent liquid 200 in the liquid condensing unit 100 and need not necessarily be transparent.

In addition, the closed cavity may be provided without the second liquid, which is a cavity structure that encloses or communicates with the external environment.

Specifically, referring to FIG. 6, in one embodiment, the two liquid condensing units 100 are placed in the large closed cavity of the bottom groove 400, and both the liquid condensing unit 100 and the double-sided light energy utilization unit 300 are immersed in the second liquid 410.

In this example, the Fresnel lens in Example 5 is replaced with the transparent hollow element 140 to facilitate processing. In other embodiments, the transparent hollow element 140 may be used in conjunction with the Fresnel lens 121 (see FIG. 5) of the reflector 120 to further increase the collection ratio.

This example also shows the flexibility in implementation: the liquid condensing unit 100 may be provided on only some of the surfaces within the closed cavity, or some of its surfaces (such as the light receiver 110) may coincide with some of the surfaces of the closed cavity.

Example 7

This Example 7 provides yet still another solar energy utilization device 1000, especially a further improvement based on Example 3.

Figure 7:
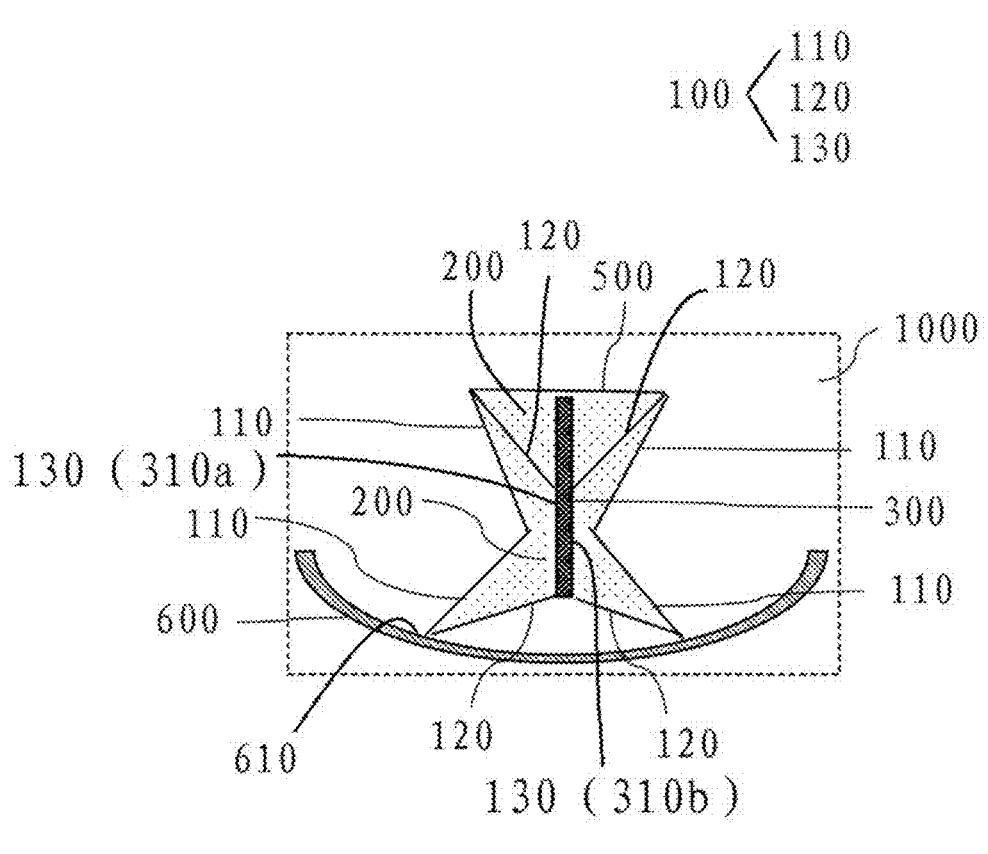
FIG. 7 is a schematic cross-sectional diagram of a solar energy utilization device according to Example 7 of the present disclosure.

Referring to FIG. 7, a cross-sectional view of a solar energy utilization device 1000 is shown. In this embodiment, the light energy utilization portion 310 is divided into the first light energy utilization portion 310*a* and the second light energy utilization portion 310*b* disposed away from each other. The liquid condensing unit 100 group includes a first liquid condensing unit group and a second liquid condensing unit group. The first liquid condensing unit group concentrates the sunlight to the first light energy utilization portion 310a and the second liquid condensing unit group concentrate sunlight to the second light energy utilization portion 310b.

This embodiment shares the same light energy utilization unit 300 with the two side-concentrating solar devices of Example 3 in a back-to-back configuration.

Further, in one embodiment, the light energy utilization unit 300 is vertically disposed, and the first liquid condensing unit group and second liquid condensing unit group are arranged in an X-shape (a four-corner star-shaped bar as shown in the cross-sectional view of FIG. 7). In the four liquid condensing units 100 of this example, the two liquid condensing units 100 located above may or may not be the same as the two liquid condensing units 100 located below.

Further, in order to further utilize light energy, in one embodiment, the upper ends of the first liquid condensing unit group and the second liquid condensing unit group define a cavity with an upward opening. The upper end of the light energy utilization unit 300 protrude into the cavity, and the upper ends of the first light energy utilization portion 310a and the second light energy utilization portion 310b are partially located in the cavity. At least a portion of the walls of the cavity is a reflective surface to concentrate the sunlight towards the first light energy utilization portion 310a and the second light energy utilization portion 310b.

Further, in one embodiment, the opening of the cavity is covered with a transparent closed cover 500, forming the cavity as a second closed cavity. The second closed cavity is filled with the transparent liquid 200, and the sunlight is transmitted from the transparent closed cover 500 into the transparent liquid 200. The transparent closed cover 500 may be flat, folded, curved, or other shapes.

In order to maximize the utilization of surrounding light energy, in an embodiment, referring to FIG. 7, an external reflecting unit 600 is further included. The light energy utilization unit 300 and the liquid condensing unit 100 are integrally arranged on the external reflecting unit 600. The external reflecting unit 600 has a reflective surface 610 to concentrate the sunlight towards the light energy utilization unit 300 and the liquid condensing unit 100.

In one embodiment, the external reflecting unit 600 has a concave-inward structure, in which the light energy utilization unit 300 and the liquid condensing unit 100 are disposed, and the reflective surface 610 is disposed on an inner wall of the concave-inward structure.

Specifically, referring to FIG. 7, the reflective surface of the external reflecting unit 600 may be either a normal mirror or a Fresnel lens reflective surface. The external reflecting unit 600 is arranged at the bottom of the entirety of the light energy utilization unit 300 and liquid condensing unit 100 or at other locations, such as a side thereof. The external reflecting unit 600 may be of any shape.

Referring to FIG. 7, the solar energy utilization device 1000 in the present embodiment can achieve concentration of almost 360 degrees direction. This solar energy utilization device 1000 can be used for north-south installation as well as east-west installation, thus greatly expanding the scope of application of this embodiment.

The above specific examples are set forth to aid in understanding the present disclosure and are not intended to limit the present disclosure. Variations of those specific embodiments may become apparent to those skilled in the art in light of the teachings herein.

The invention claimed is:

1. A solar energy utilization device, comprising:
a light energy utilization unit having a light energy utilization portion capable of receiving, converting and utilizing sunlight, wherein the light energy utilization portion is divided into a first light energy utilization portion and a second light energy utilization portion arranged away from each other; and a first liquid condensing unit group and a second liquid condensing unit group, the first liquid condensing unit group concentrating the sunlight to the first light energy utilization portion, and the second liquid condensing unit group concentrating the sunlight to the second light energy utilization portion;

wherein each liquid condensing unit group comprises two adjacent liquid condensing units which are arranged on a same side of the light energy utilization unit, each liquid condensing unit has a closed cavity being filled with a transparent liquid therein, a cavity wall of the closed cavity comprising a light receiver capable of transmitting sunlight into the transparent liquid, a reflector for reflecting incident sunlight and a condenser, the transparent liquid being in contact with the light receiver, the sunlight in each liquid condensing unit transmitted from the transparent liquid to the light receiver forming a total reflection phenomenon so as to concentrate the sunlight onto respective light energy utilization portion, the transparent liquid of the two adjacent liquid condensing units is communicated in each of the liquid condensing unit groups, the light receivers of the two adjacent liquid condensing units are connected to each other with a V-shaped connecting section in each of the liquid condensing unit groups, wherein the light energy utilization unit is arranged vertically, the first liquid condensing unit group and the second liquid condensing unit group are distributed in an X shape, and upper ends of the first liquid condensing unit group and the second liquid condensing unit group define a cavity with an upper opening.

2. The solar energy utilization device according to claim 1, wherein a structure is arranged between the reflector and the light receiver of at least one liquid condensing unit of the first and second liquid condensing unit groups such that the sunlight, after being reflected by the reflector, is transmitted from the transparent liquid to the light receiver to form the total reflection phenomenon.

3. The solar energy utilization device according to claim 2, wherein at least part of a reflective surface of the reflector forms an acute angle with a light receiving surface of the light receiver, the acute angle being less than or equal to 40 degrees.

4. The solar energy utilization device according to claim 1, wherein at least one liquid condensing unit of the first and second liquid condensing unit groups comprises a light guide element arranged in the transparent liquid and concentrating the sunlight to the light energy utilization unit.

5. The solar energy utilization device according to claim 4, wherein at least one liquid condensing unit comprises a hollow element; and a partial wall of the hollow element is closely attached to or integrated with the light guide element so as to concentrate the sunlight to the light energy utilization unit by reflection.

6. The solar energy utilization device according to claim 1, wherein an upper end of the light energy utilization unit is extended into the cavity, part of both upper ends of the first light energy utilization portion and the second light energy utilization portion are located in the cavity, the opening of the cavity is covered with a transparent closed cover to form a second closed cavity filled with transparent liquid, the sunlight is transmitted into the transparent liquid from the transparent closed cover, and at least partial wall of the cavity is a reflective surface so as to concentrate the sunlight to the first light energy utilization portion and the second light energy utilization portion.

7. The solar energy utilization device according to claim 1, further comprising an external reflecting unit arranged outside the light energy utilization unit and the first and second liquid condensing unit groups wholly, the external reflecting unit having a reflective surface to concentrate the sunlight to the light energy utilization unit and the first and second liquid condensing unit groups, and the external reflecting unit having a concave-inward structure or a Fresnel lens reflective surface.

\* \* \* \* \*